US009082435B1

(12) United States Patent
Braganca et al.

(10) Patent No.: US 9,082,435 B1
(45) Date of Patent: Jul. 14, 2015

(54) FABRICATION OF MULTIPLE SENSOR LAYERS WITH SELF-ALIGNED BACK EDGE

(71) Applicant: HGST Netherlands B.V., Amsterdam (NL)

(72) Inventors: Patrick M. Braganca, San Jose, CA (US); Yang Li, San Jose, CA (US); Jordan A. Katine, Mountain View, CA (US); Neil L. Robertson, Palo Alto, CA (US)

(73) Assignee: HGST NETHERLANDS, B.V., Amsterdam (NL)

( * ) Notice: Subject to any disclaimer, the term of this patent is extended or adjusted under 35 U.S.C. 154(b) by 0 days.

(21) Appl. No.: 14/156,274

(22) Filed: Jan. 15, 2014

(51) Int. Cl.
G11B 5/39 (2006.01)

(52) U.S. Cl.
CPC ............. G11B 5/3948 (2013.01); G11B 5/39 (2013.01); G11B 5/3951 (2013.01)

(58) Field of Classification Search
CPC ...... G11B 5/39; G11B 5/3903; G11B 5/3906; G11B 5/3912; G11B 5/3929; G11B 5/3932; G11B 5/3945; G11B 5/3948; G11B 5/3951; G11B 5/3967
USPC ......... 360/314, 315, 316, 319, 324.1, 324.11, 360/324.12, 324.2, 324
See application file for complete search history.

(56) References Cited

U.S. PATENT DOCUMENTS

| 5,079,831 | A | 1/1992 | Reid |
| 5,309,305 | A | 5/1994 | Nepela et al. |
| 5,442,508 | A | 8/1995 | Smith |
| 5,508,868 | A | 4/1996 | Cheng et al. |
| 5,784,772 | A | 7/1998 | Ewasko et al. |
| 6,278,594 | B1 | 8/2001 | Engel et al. |
| 6,822,838 | B2 | 11/2004 | Lin et al. |
| 7,079,359 | B1* | 7/2006 | He et al. ........................ 360/314 |
| 7,227,726 | B1 | 6/2007 | Denison et al. |
| 7,405,907 | B2* | 7/2008 | Raastad ........................ 360/315 |
| 8,786,987 | B2* | 7/2014 | Edelman et al. ......... 360/324.12 |
| 8,908,333 | B1* | 12/2014 | Rudy et al. .................... 360/319 |
| 2002/0131215 | A1* | 9/2002 | Beach ........................ 360/324.2 |
| 2011/0069413 | A1* | 3/2011 | Maat et al. ................. 360/234.3 |

OTHER PUBLICATIONS

Cardoso, S. et al. "Performance of Dual-Stripe Giant Magnetoresistive Heads on Tape"; IEEE Transaction on Magnetics; vol. 35, Issue 5; Sep. 1999.

* cited by examiner

Primary Examiner — Jefferson Evans
(74) Attorney, Agent, or Firm — Patterson & Sheridan, LLP

(57) ABSTRACT

The embodiments of the present invention relate to a method for forming a magnetic read head having one or more sensors disposed over one or more sensors. The method includes forming one or more first sensors on a shield, forming a spacer layer over the one or more first sensors and forming one or more second sensors over the spacer layer. A single photolithography process is performed on a resist that is disposed over a portion of the one or more second sensors, the spacer layer and the one or more first sensors, and portions of the one or more second sensors, the spacer layer and the one or more first sensors not covered by the resist are removed by multiple removal processes. The stripe heights of the free layers and the pinned layers of the one or more first sensors and the one or more second sensors are defined as a result of the multiple removal processes.

7 Claims, 10 Drawing Sheets

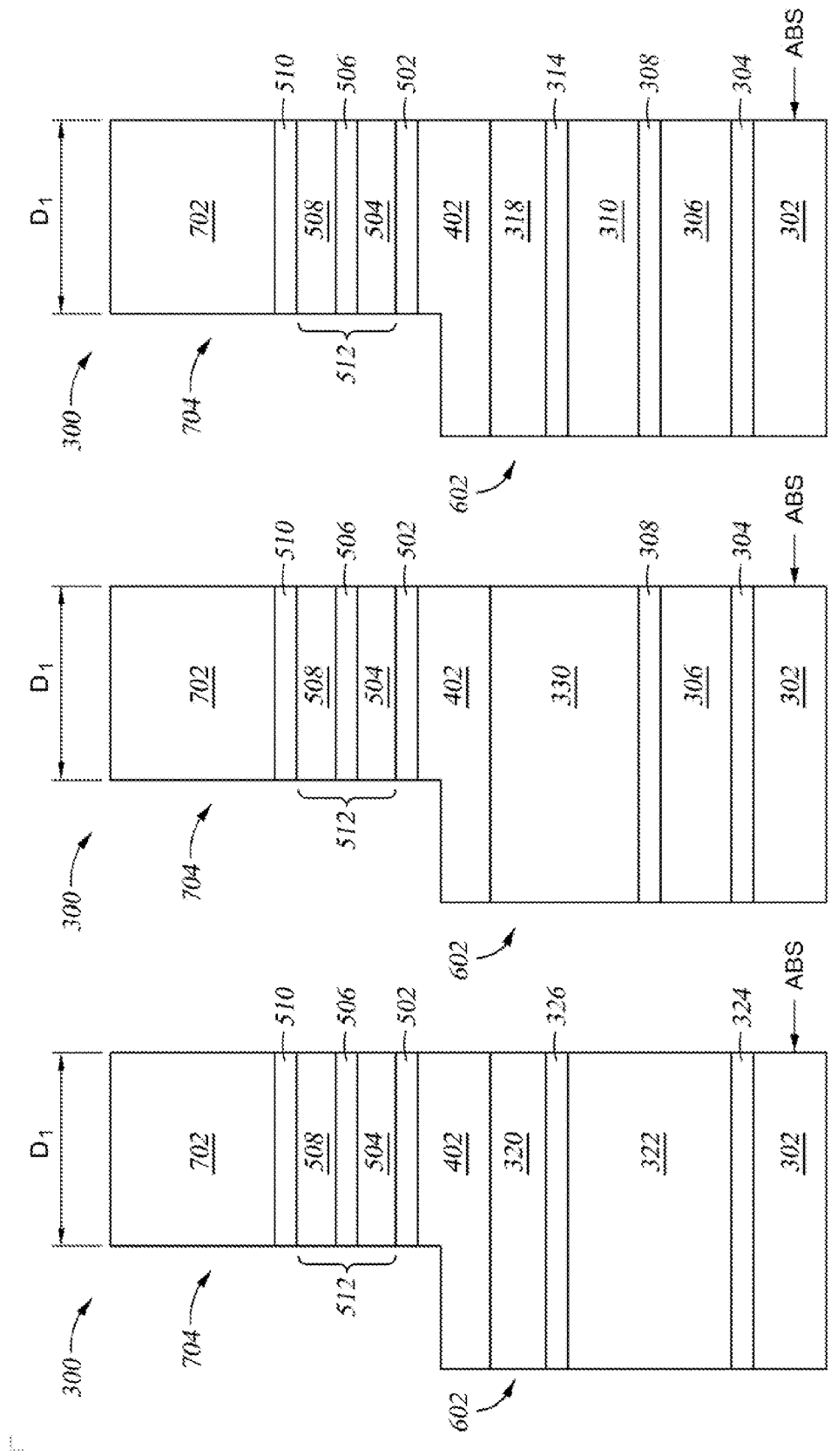

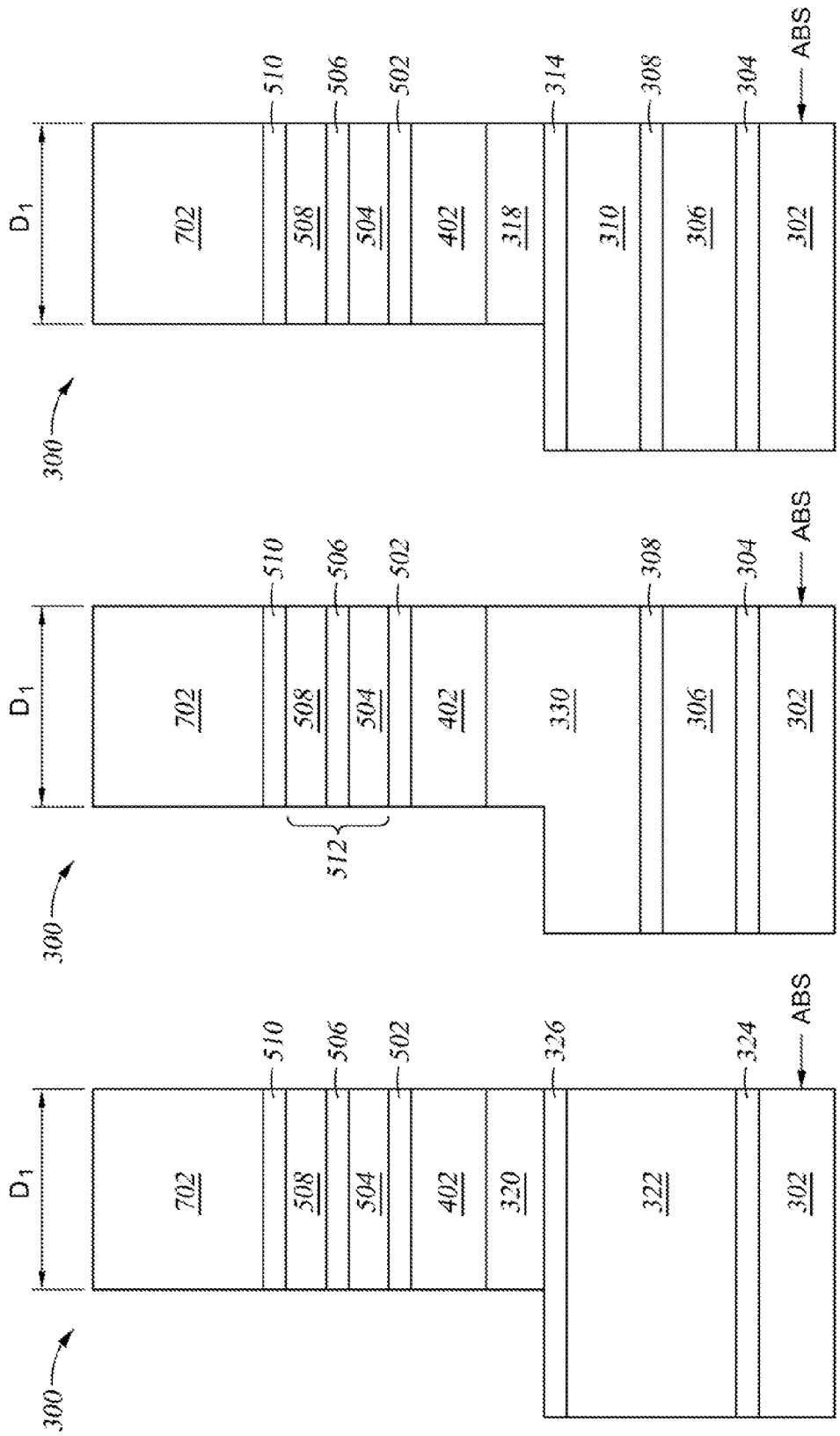

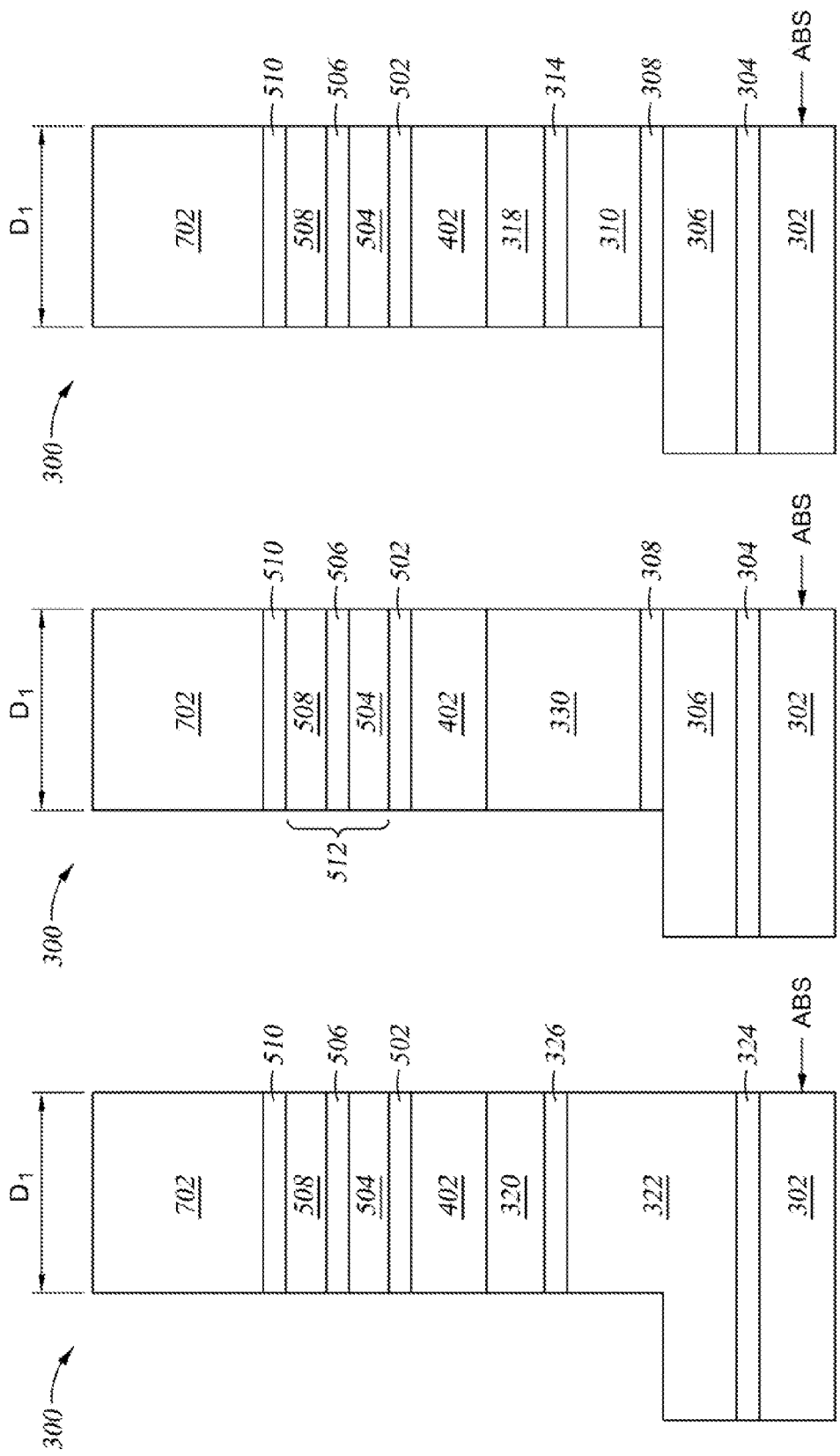

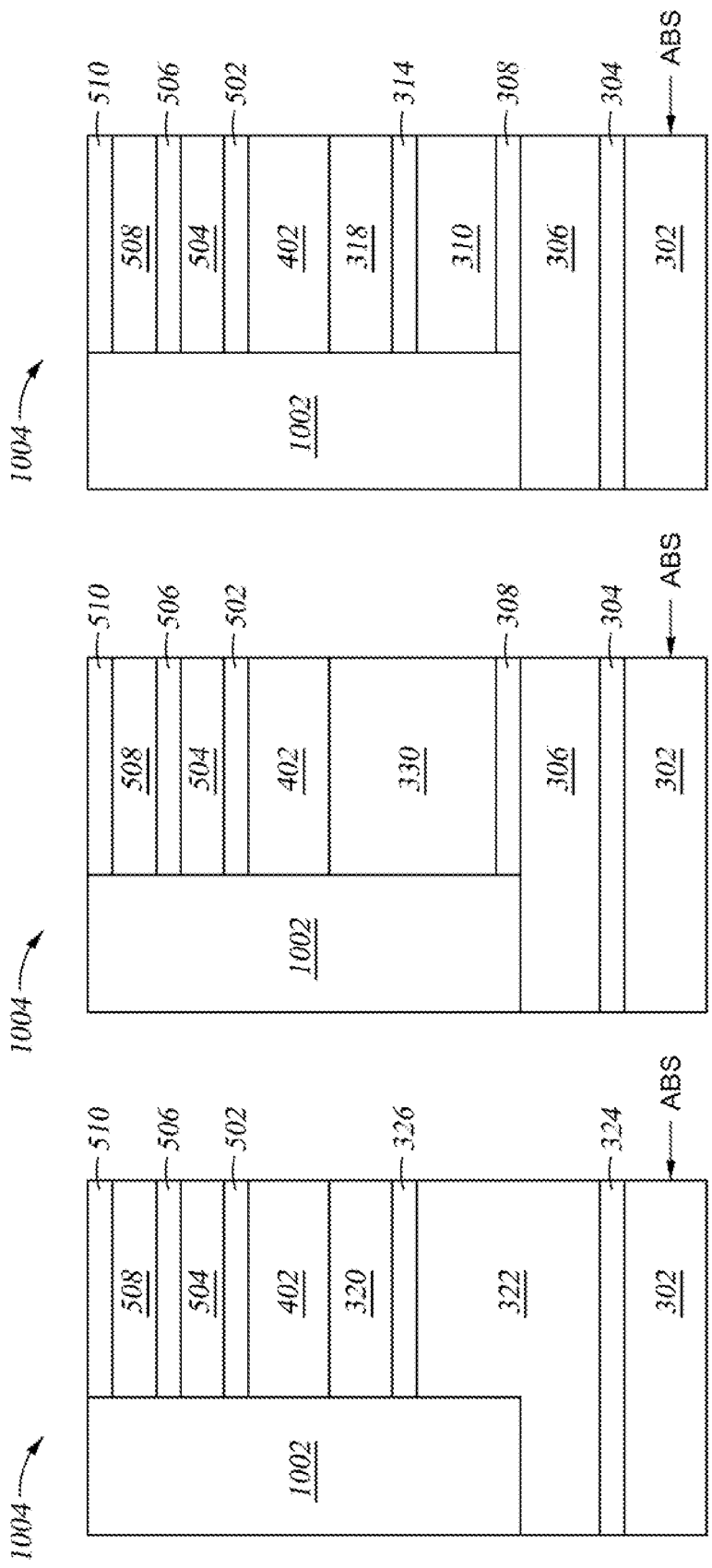

FABRICATION OF MULTIPLE SENSOR LAYERS WITH SELF-ALIGNED BACK EDGE

BACKGROUND

1. Field

Embodiments of the present invention generally relate to a magnetic read head for use in a hard disk drive.

2. Description of the Related Art

The heart of a computer is a magnetic disk drive which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider towards the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing, the write and read heads are employed for writing magnetic impressions to and reading magnetic signal fields from the rotating disk. The read and write heads are connected to processing circuitry that operates according to a computer program to implement the writing and reading functions.

The read head typically utilizes a spin valve sensor, also referred to as a magnetoresistive (MR) sensor. The sensor at the ABS typically includes a spacer layer sandwiched between a pinned layer and a free layer. The magnetization of the pinned layer is pinned perpendicular to the ABS and the magnetic moment of the free layer is located parallel to the ABS, but free to rotate in response to external magnetic fields.

The read sensor has an end extending to the ABS and a back edge which is recessed in the read head that is opposite the ABS. The back edge is precisely located by photolithographic processing. During construction, the ABS is also precisely defined so that the read sensor has a precise stripe height which is the distance between the ABS and the back edge. Therefore, an improved magnetic read head and method for forming the magnetic read head is needed.

SUMMARY OF THE INVENTION

The embodiments of the present invention relate to a method for forming a magnetic read head having one or more sensors disposed over one or more sensors. The method includes forming one or more first sensors on a shield, forming a spacer layer over the one or more sensors and forming one or more second sensors over the spacer layer. A single photolithography process is performed on a resist that is disposed over a portion of the one or more second sensors, the spacer layer and the one or more first sensors, and portions of the one or more second sensors, the spacer layer and the one or more first sensors not covered by the resist are removed by multiple removal processes. The stripe heights of the free layers and the pinned layers of the one or more first sensors and the one or more second sensors are defined as a result of the multiple removal processes.

In one embodiment, a magnetic read head for multiple input multiple output recording is disclosed. The magnetic read head includes side by side sensors disposed over a shield, where the side by side sensors includes a shield, a first pinned layer disposed over a portion of the shield, a first spacer layer disposed over the first pinned layer, a first free layer disposed over a first portion of the first spacer layer, a second free layer disposed over a second portion of the first spacer layer, and an insulative nonmagnetic material disposed over a third portion of the first spacer layer. The magnetic read head further includes a second spacer layer disposed over the side by side sensors and one or more second sensors disposed over the spacer layer.

In another embodiment, a method for forming a magnetic read head for multiple input multiple output recording is disclosed. The method includes forming one or more first sensors on a shield, forming a first spacer layer over the one or more first sensors, forming one or more second sensors over the first spacer layer, and forming a resist on the one or more second sensors. The resist covers a first portion of the one or more second sensors, the first spacer layer and the one or more first sensors. The method further includes removing a second portion of the one or more second sensors to define a first stripe height of a pinned layer and a free layer of each of the one or more second sensors, removing a second portion of the first spacer layer, and removing a second portion of the one or more first sensors to define a second stripe height of a free layer of each of the one or more first sensors. The first stripe height is substantially the same as the second stripe height.

In another embodiment, a method for forming a magnetic read head for multiple input multiple output recording is disclosed. The method includes forming side by side sensors on a shield, forming a first spacer layer over the side by side sensors, forming a second sensor over the first spacer layer, and forming a resist on the second sensor. The resist covers a first portion of the second sensor, the first spacer layer and the side by side sensors. The method further includes removing a second portion of the second sensor to define a first stripe height of a pinned layer and a free layer of the second sensor, removing a second portion of the first spacer layer, and removing a second portion of the side by side sensors to define a second stripe height of a free layer of each of the side by side sensors. The first stripe height is substantially the same as the second stripe height.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments in any field involving magnetic sensors.

FIGS. 7A-7C are cross sectional side views of the sensor stack according to one embodiment.

FIGS. 8A-8C are cross sectional side views of the sensor stack according to one embodiment.

FIGS. 9A-9C are cross sectional side views of the sensor stack according to one embodiment.

FIGS. 10A-10C are cross sectional side views of the sensor stack according to one embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The embodiments of the present invention relate to a method for forming a magnetic read head having one or more sensors disposed over one or more sensors. The method includes forming one or more first sensors on a shield, forming a spacer layer over the one or more sensors and forming one or more second sensors over the spacer layer. A single photolithography process is performed on a resist that is disposed over a portion of the one or more second sensors, the spacer layer and the one or more first sensors, and portions of the one or more second sensors, the spacer layer and the one or more first sensors not covered by the resist are removed by multiple removal processes. The stripe heights of the free layers and the pinned layers of the one or more first sensors and the one or more second sensors are defined as a result of the multiple removal processes.

Figure 1:
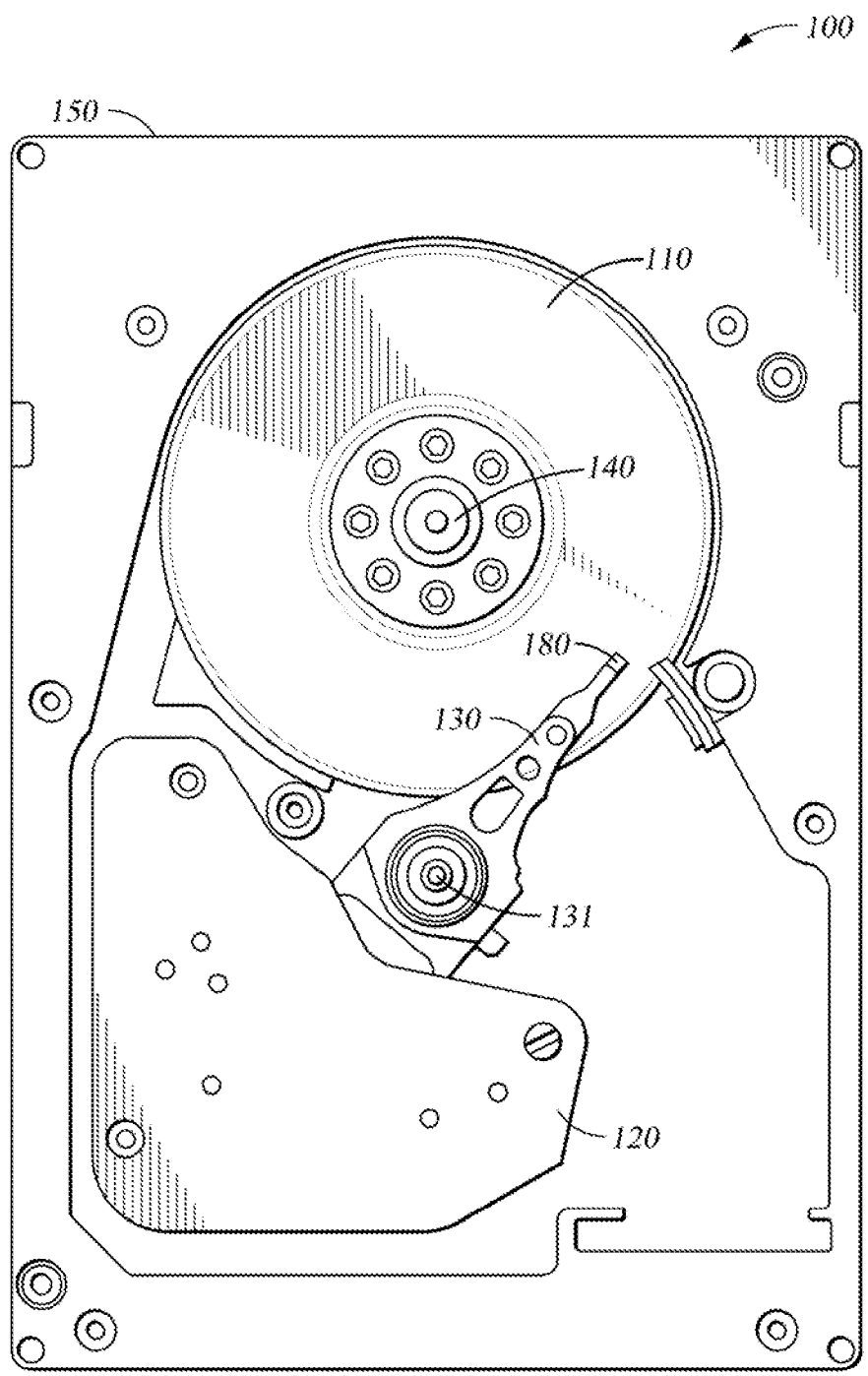
FIG. 1 illustrates an exemplary magnetic disk drive, according to an embodiment of the invention.

FIG. 1 illustrates a top view of an exemplary hard disk drive (HDD) 100, according to an embodiment of the invention. As illustrated, HDD 100 may include one or more magnetic disks 110, actuator 120, actuator arms 130 associated with each of the magnetic disks 110, and spindle motor 140 affixed in a chassis 150. The one or more magnetic disks 110 may be arranged vertically as illustrated in FIG. 1. Moreover, the one or more magnetic disks may be coupled with the spindle motor 140.

Magnetic disks 110 may include circular tracks of data on both the top and bottom surfaces of the disk. A magnetic head 180 mounted on a slider may be positioned on a track. As each disk spins, data may be written on and/or read from the data track. Magnetic head 180 may be coupled to an actuator arm 130 as illustrated in FIG. 1. Actuator arm 130 may be configured to swivel around actuator axis 131 to place magnetic head 180 on a particular data track.

Figure 2:
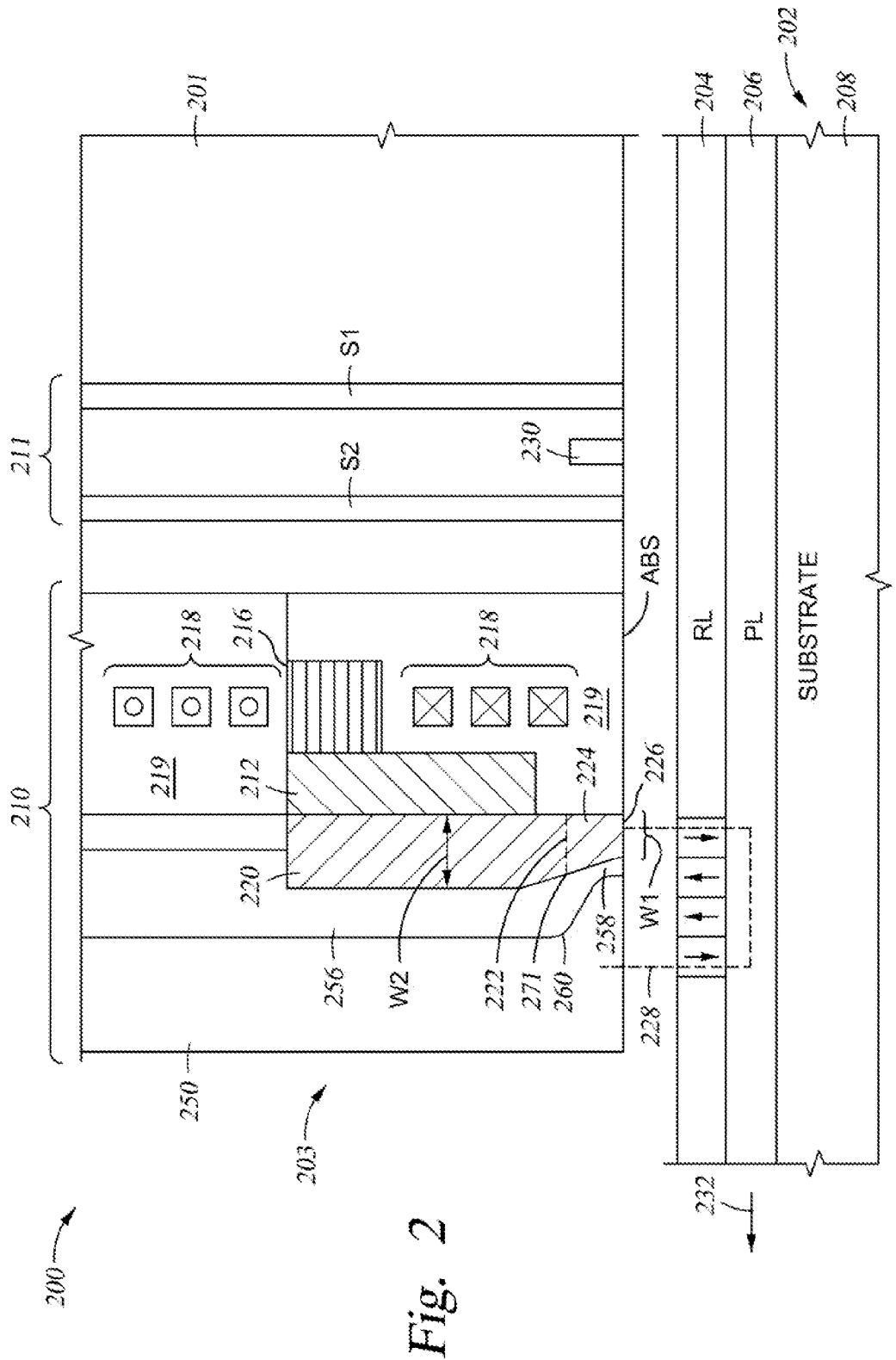
FIG. 2 is a side view of a read/write head and magnetic disk of the disk drive of FIG. 1, according to one embodiment of the invention.

FIG. 2 is a fragmented, cross-sectional side view through the center of a read/write head 200 mounted on a slider 201 and facing magnetic disk 202. The read/write head 200 and magnetic disk 202 may correspond to the magnetic head 180 and magnetic disk 110, respectively in FIG. 1. In some embodiments, the magnetic disk 202 may be a "dual-layer" medium that includes a perpendicular magnetic data recording layer (RL) 204 on a "soft" or relatively low-coercivity magnetically permeable underlayer (PL) 206 formed on a disk substrate 208. The read/write head 200 includes an ABS, a magnetic write head 210 and a magnetic read head 211, and is mounted such that the ABS is facing the magnetic disk 202. In FIG. 2, the disk 202 moves past the write head 210 in the direction indicated by the arrow 232, so the portion of slider 201 that supports the read/write head 200 is often called the slider "trailing" end 203.

The magnetic read head 211 is a magneto-resistive (MR) read head that includes a MR sensing element 230 located between MR shields S1 and S2, which are composed of a highly permeable and magnetically soft material such as permalloy. The distance between S1 and S2, which is the sensor thickness, defines the read gap of the read head. The MR sensing element 230 may include multiple sensors disposed on different levels, which are described in detail below. The RL 204 is illustrated with perpendicularly recorded or magnetized regions, with adjacent regions having magnetization directions, as represented by the arrows located in the RL 204. The magnetic fields of the adjacent magnetized regions are detectable by the MR sensing element 230 as the recorded bits.

The write head 210 includes a magnetic circuit made up of a main pole 212 and a yoke 216. The write head 210 also includes a thin film coil 218 shown in the section embedded in non-magnetic material 219 and wrapped around yoke 216. In an alternative embodiment, the yoke 216 may be omitted, and the coil 218 may wrap around the main pole 212. A write pole 220 is magnetically connected to the main pole 212 and has an end 226 that defines part of the ABS of the magnetic write head 210 facing the outer surface of disk 202.

Write pole 220 is a flared write pole and includes a flare point 222 and a pole tip 224 that includes an end 226 that defines part of the ABS. The flare may extend the entire height of write pole 220 (i.e., from the end 226 of the write pole 220 to the top of the write pole 220), or may only extend from the flare point 222, as shown in FIG. 2. In one embodiment the distance between the flare point 222 and the ABS is between about 30 nm and about 150 nm.

The write pole 220 includes a tapered surface 271 which increases a width of the write pole 220 from a first width W1 at the ABS to a second width W2 away from the ABS. In one embodiment, the width W1 may be between around 60 nm and 200 nm, and the width W2 may be between around 120 nm and 350 nm. While the tapered region 271 is shown with a single straight surface in FIG. 2, in alternative embodiment, the tapered region 271 may include a plurality of tapered surface with different taper angles with respect to the ABS.

The tapering improves magnetic performance. For example, reducing the width W1 at the ABS may concentrate a magnetic field generated by the write pole 220 over desirable portions of the magnetic disk 202. In other words, reducing the width W1 of the write pole 220 at the ABS reduces the probability that tracks adjacent to a desirable track are erroneously altered during writing operations.

While a small width of the write pole 220 is desired at the ABS, it may be desirable to have a greater width of the write pole 220 in areas away from the ABS. A larger width W2 of the write pole 220 away from the ABS may desirably increase the magnetic flux to the write pole 220, by providing a greater thickness of the write pole 220 in a direction generally parallel to the ABS. In operation, write current passes through coil 218 and induces a magnetic field (shown by dashed line 228) from the write pole 220 that passes through the RL 204 (to magnetize the region of the RL 204 beneath the write pole 220), through the flux return path provided by the PL 206, and back to an upper return pole 250. In one embodiment, the greater the magnetic flux of the write pole 220, the greater is the probability of accurately writing to desirable regions of the RL 204.

FIG. 2 further illustrates one embodiment of the upper return pole or magnetic shield 250 that is separated from write pole 220 by a nonmagnetic gap layer 256. In some embodiments, the magnetic shield 250 may be a trailing shield wherein substantially all of the shield material is on the trailing end 203. Alternatively, in some embodiments, the magnetic shield 250 may be a wrap-around shield wherein the shield covers the trailing end 203 and also wraps around the sides of the write pole 220. As FIG. 2 is a cross section through the center of the read/write head 200, it represents both trailing and wrap-around embodiments.

Near the ABS, the nonmagnetic gap layer 256 has a reduced thickness and forms a shield gap throat 258. The throat gap width is generally defined as the distance between the write pole 220 and the magnetic shield 250 at the ABS. The shield 250 is formed of magnetically permeable material (such as Ni, Co and Fe alloys) and gap layer 256 is formed of nonmagnetic material (such as Ta, TaO, Ru, Rh, NiCr, SiC or $Al_2O_3$). A taper 260 in the gap material provides a gradual transition from the throat gap width at the ABS to a maximum gap width above the taper 260. This gradual transition in width forms a tapered bump in the non-magnetic gap layer that allows for greater magnetic flux density from the write pole 220, while avoiding saturation of the shield 250.

It should be understood that the taper 260 may extend either more or less than is shown in FIG. 2. The taper may extend upwards to an end of shield 250 opposite the ABS (not shown), such that the maximum gap width is at the end of the shield opposite the ABS. The gap layer thickness increases from a first thickness (the throat gap width) at the ABS to greater thicknesses at a first distance from the ABS, to a final thickness at a second distance (greater than the first distance) from the ABS.

Figure 3:
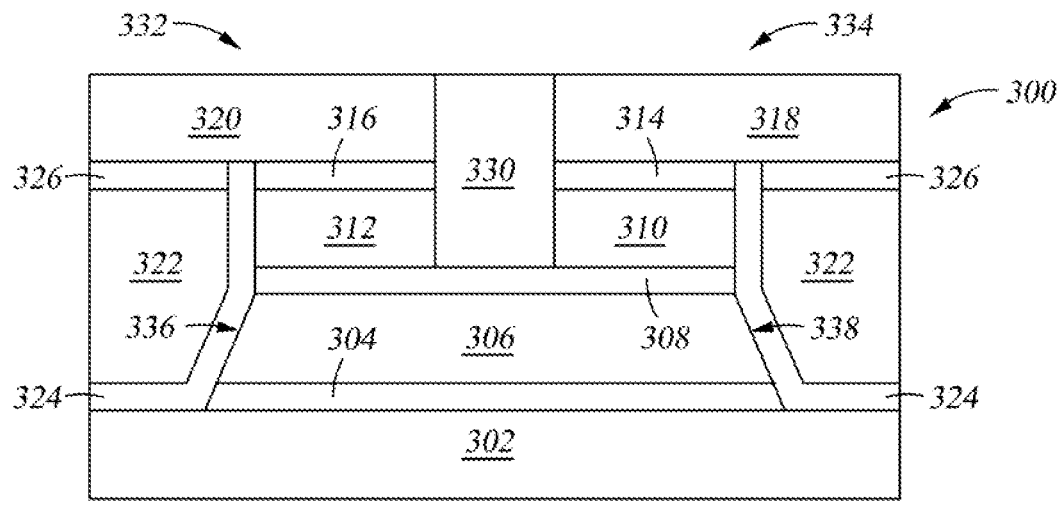
FIG. 3 is an ABS view of a sensor stack of a magnetic read head according to one embodiment.

FIG. 3 is an ABS view of a sensor stack 300 of the magnetic read head 211 according to one of the embodiments. The sensor stack 300 includes side by side sensors 332, 334, each having its own lead layer 320, 318, capping layer 316, 314, and free layer 312, 310, respectively. The capping layer 314 and the free layer 310 are separated from the capping layer 316 and free layer 312 by an insulative nonmagnetic material 330. The insulative nonmagnetic material 330 may comprise a bilayer structure including a first layer of alumina formed on a spacer layer 308, and a second layer of $SiO_x$ or $TaO_x$ formed on the first layer. The sensors 332, 334 share the spacer layer 308 and a pinned layer 306 and are disposed on a seed layer 304, which is disposed on a shield 302. The shield 302 may be the shield S1 and may comprise a ferromagnetic material. Suitable ferromagnetic materials that may be utilized include Ni, Fe, Co, NiFe, NiFeCo, NiCo, CoFe and combinations thereof. The seed layer 304 may comprise Ta or Ru. The pinned layer 306 may be a ferromagnetic layer comprising NiFe, CoFe, CoFeB, Co, CoZr, CoHf or CoFeTaB. The pinned layer 306 may comprise a multilayer structure such as an antiparallel (AP) pinned structure having a first magnetic layer, a second magnetic layer and a nonmagnetic AP coupling layer sandwiched between the two magnetic layers. The first and second magnetic layers may be constructed of several magnetic materials such as, for example NiFe, CoFe, CoFeB, Co, CoZr, CoHf or CoFeTaB. The nonmagnetic layer may comprise Ru. The spacer layer 308 may comprise an insulating material such as MgO, $TiO_2$ or alumina, or a nonmagnetic material such as Cu, Ag or the like. The free layers 310, 312 may comprise ferromagnetic materials such as Co, CoFe, CoFeB, NiFe, CoHf or combinations thereof. The capping layers 314, 316 may comprise a material such as Ru, Ta or a layered structure of these materials. The lead layers 318, 320 may comprise any refractory hard metal that is reactive ion etchable, such as W, or magnetic material such as CoFe, NiFe or the like.

Adjacent the sensors 332, 334 is a bias material 322. The bias material 322 may be a hard or soft bias comprising a material having a high magnetic moment such as CoFe or NiFe. An insulating layer 324 is first deposited on the shield 302 and the side walls 336, 338, of the sensors 332, 334, respectively, and then the bias material 322 is deposited on the insulating layer 324. The insulating layer 314 may be made of an insulating material such as alumina, silicon nitride, silicon dioxide, tantalum oxide or other suitable materials. A bias capping layer 326 may be deposited on the bias material 322. The layers 304, 306, 308, 310, 312, 314, 316, 318, 320, 322, 324, 326 and 330 may be deposited by physical vapor deposition (PVD), chemical vapor deposition, ion beam deposition (IBD) or any other suitable deposition method. At this stage, the stripe heights of the pinned layer 306 and the free layers 310, 312 have not been defined, meaning, the sensor stack 300 as shown in FIG. 3 extends at least 1 micrometer into the page.

Figure 4:
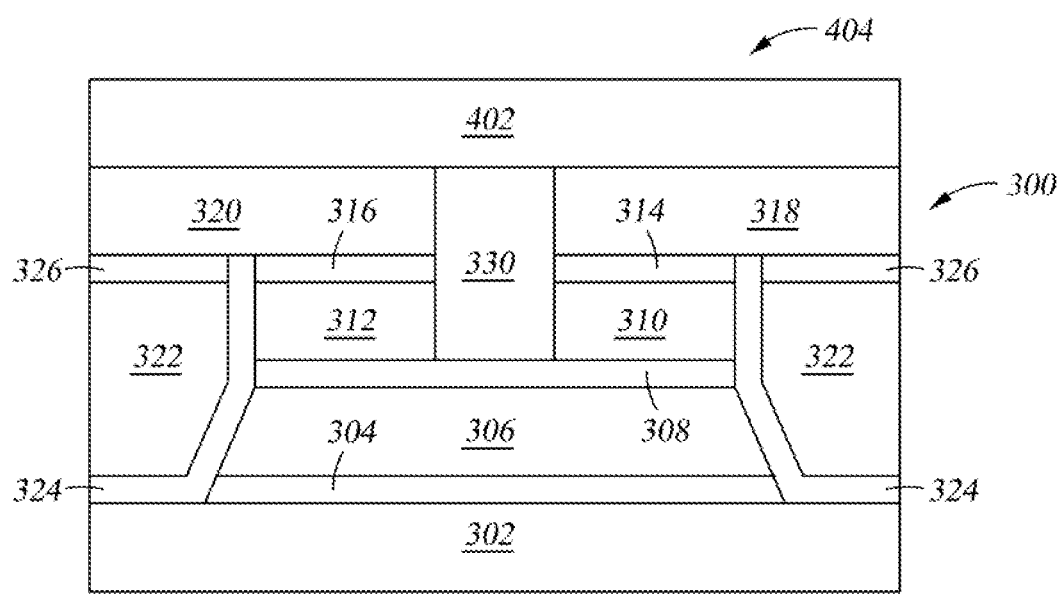
FIG. 4 is an ABS view of a sensor stack of the magnetic read head according to one embodiment.

Next, as shown in FIG. 4, a spacer layer 402 is formed on the lead layers 318, 320 and the insulative nonmagnetic material 330. In one embodiment, the spacer layer 402 comprises a fluorine chemistry reactive ion etchable (RIEable) insulative material such as $SiO_x$, $TaO_x$ or other suitable insulative material, and may have a thickness of greater than 15 nm. In another embodiment, the spacer layer 402 comprises a magnetic metal shield and the lead layers 318, 320 are not present. The metal spacer layer 402 may be a RIEable metal such as W, Ta, Ti, or a non-RIEable metal such as NiFe or Rh. If a soft magnetic material is used, it can serve as a middle shield which would improve the downtrack resolution of the sensors. One drawback of using non-RIEable materials is that this spacer layer 402 would then require ion milling to etch, which would tighten the process tolerances. A top surface 404 of the sensor stack 300 may be planarized by a chemical mechanical polishing (CMP) process.

Figure 5:
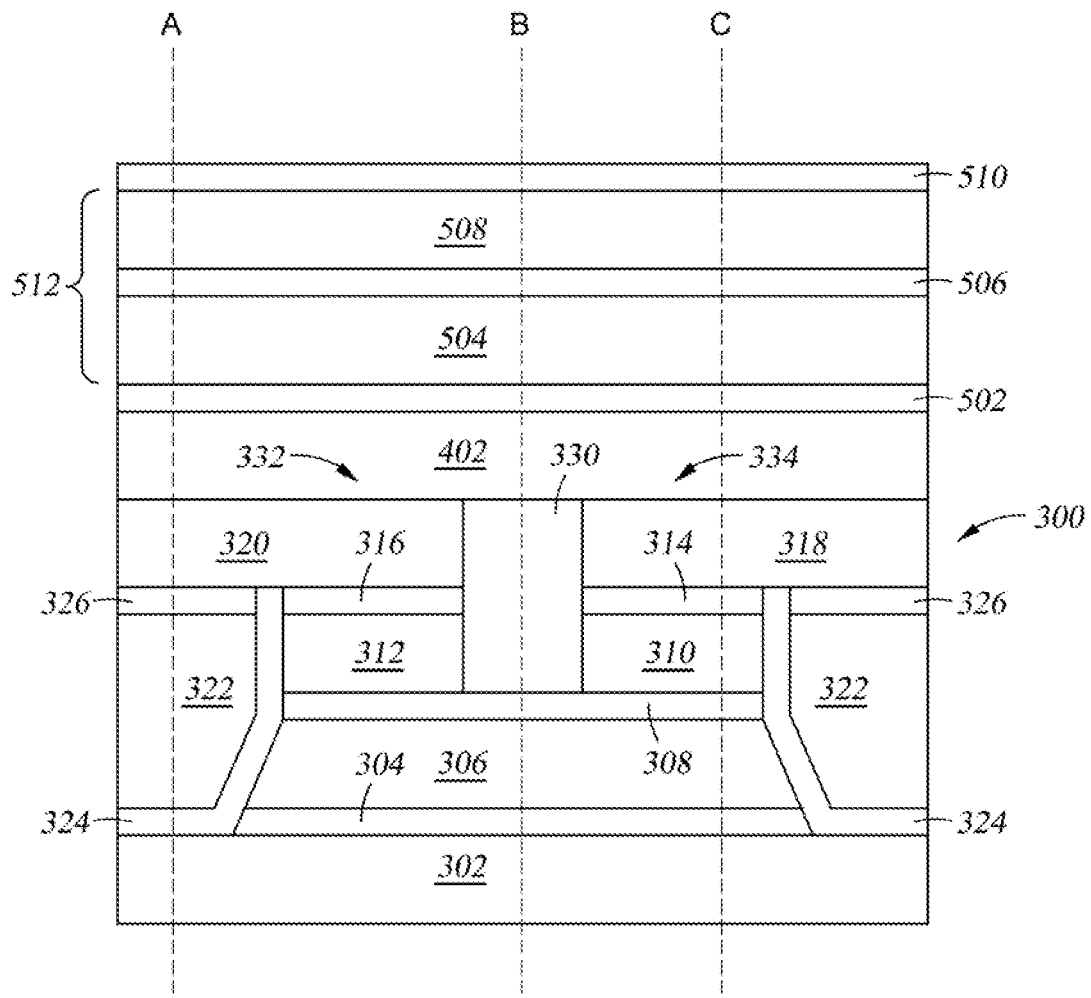
FIG. 5 is an ABS view of a sensor stack of the magnetic read head according to one embodiment.

As shown in FIG. 5, a seed layer 502 is deposited on the spacer layer 402. The seed layer 502 may comprise Ta, Ru or other suitable material. In one embodiment, both seed layers 304, 502 are made of the same material. In another embodiment, both seed layers 304, 502 are made of different materials. A pinned layer 504 is deposited on the seed layer 502. The pinned layer 504 may comprise the same material as the pinned layer 306. A spacer layer 506 is deposited on the pinned layer 504, a free layer 508 is deposited on the spacer layer 506, and a capping layer 510 is deposited on the free layer 508. The pinned layer 504 may comprise the same material as the pinned layer 306, the free layer 508 may comprise the same material as free layers 310, 312, and the capping layer 510 may comprise the same material as capping layers 314, 316. As shown in FIG. 5, the resulting sensor stack 300 has side by side sensors 332, 334 disposed on a first level and a sensor 512 disposed on a second level that is over first level. The sensors 332, 334, 512 may be used for multiple input multiple output (MIMO) recording. The number of sensors for MIMO recording is not limited to two on the first level and one on the second level. In one embodiment, the first level has one sensor and the second level has one sensor. In another embodiment, the first level has one sensor and the second level has two sensors. In yet another embodiment, there are two sensors on each level.

As mentioned above, stripe heights of the pinned layers 306, 504 and free layers 310, 312, 508 have not been defined. A method for forming self-aligned back edges, i.e., defining stripe heights, of the pinned layer 504 and free layers 310, 312, 508, is described below.

Figure 6A:
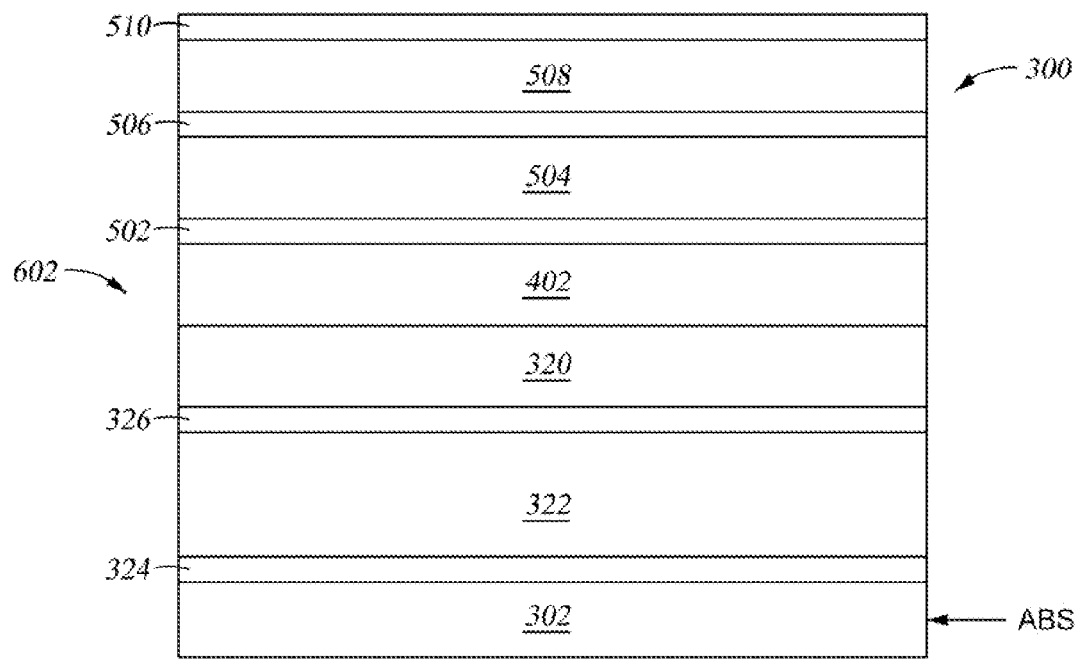
FIGS. 6A-6C are cross sectional side views of the sensor stack according to one embodiment.
Figure 6B:
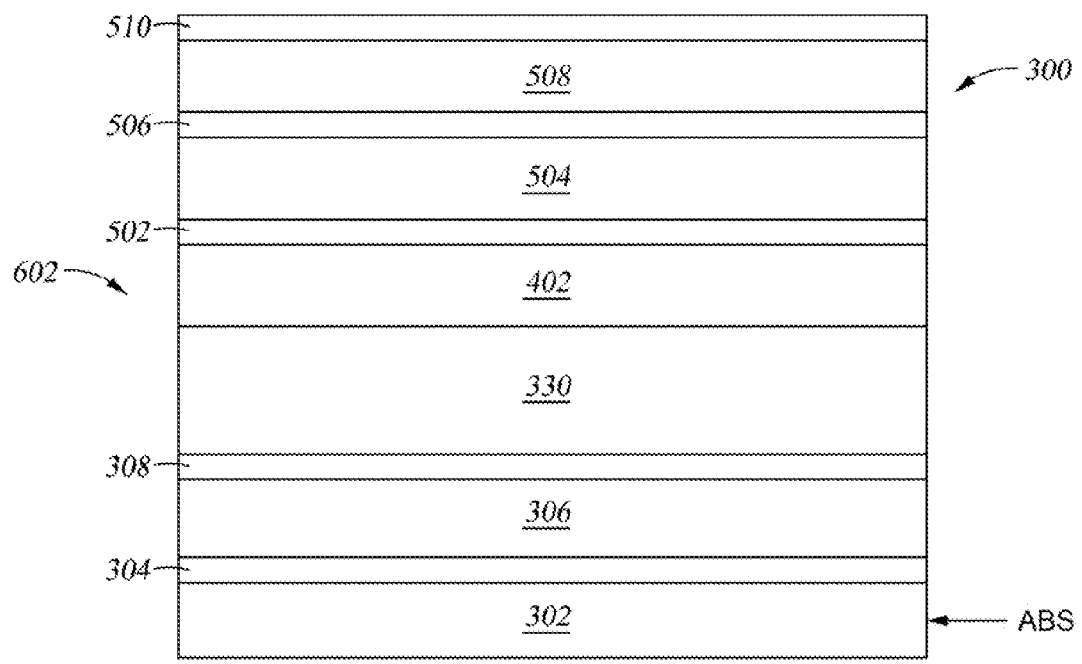
Figure 6C:
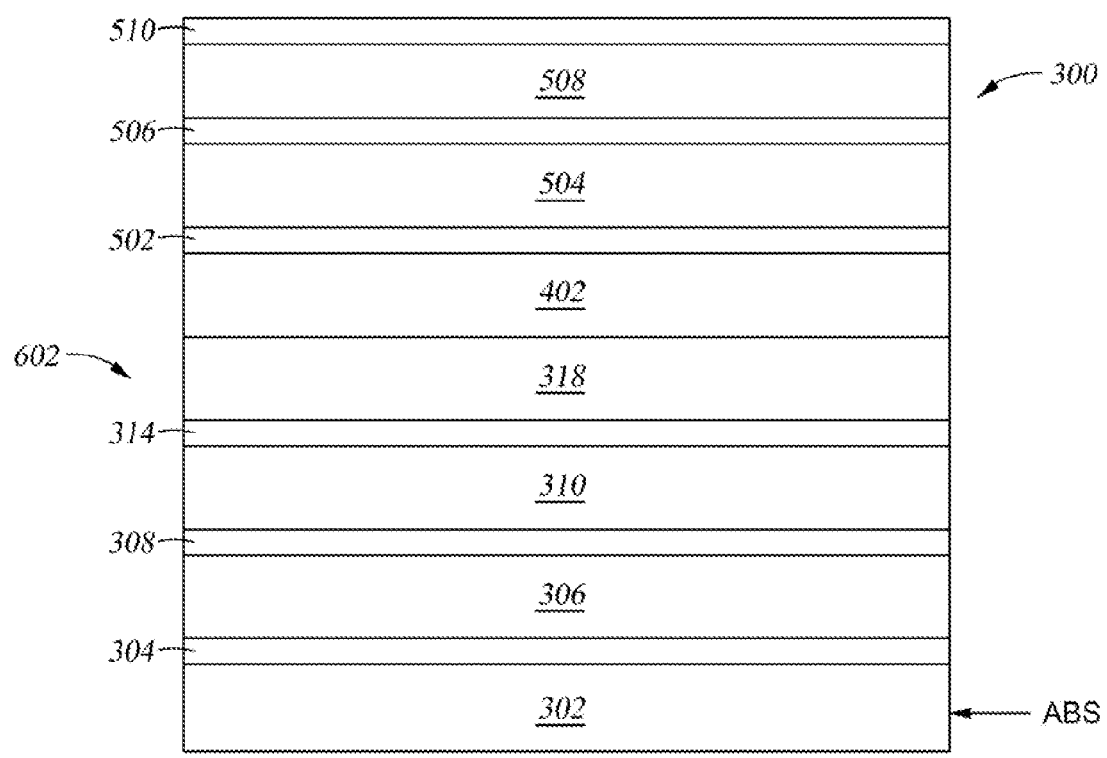

FIGS. 6A-6C, 7A-7C, 8A-8C, 9A-9C and 10A-10C are cross sectional views of the sensor stack 300 at locations A, B and C shown in FIG. 5 at various process stages. FIGS. 6A, 7A, 8A, 9A and 10A are cross sectional views at location A, FIGS. 6B, 7B, 8B, 9B and 10B are cross sectional views at location B, and FIGS. 6C, 7C, 8C, 9C and 10C are cross sectional views at location C. FIG. 6A is a cross sectional view of the sensor stack 300 at location A shown in FIG. 5. The layers 510, 508, 506, 504, 502, 402, 320, 326, 322, 324 and 302 have a first end at the ABS and a second end at a location 602 that is recessed from the ABS. FIG. 6B is a cross sectional view of the sensor stack 300 at location B shown in FIG. 5. Similarly, the layers 510, 508, 506, 504, 502, 402, 330, 308, 306, 304 and 302 have a first end at the ABS and the second end at the location 602 that is recessed from the ABS. FIG. 6C is a cross sectional view of the sensor stack 300 at location C shown in FIG. 5. Again the layers 510, 508, 506, 504, 502, 402, 318, 314, 310, 308, 306, 304 and 302 have a first end at the ABS and the second end at the location 602 recessed from the ABS.

Next, a resist 702 is formed on the capping layer 510 that covers a portion of the capping layer 510 that extends to the ABS, as shown in FIGS. 7A-7C. The resist 702 may be formed by a single photolithography process, and as described in detail below, this single photolithography process helps form the self-aligned back edges of the free layers 508, 310, 312 and the pinned layer 504. In other words, the pinned layer and the free layer of the top sensor, and the free layers of the bottom sensors are aligned with just one photolithography process, while the shared pinned layer of the bottom sensors is an extended pinned layer (EPL) which enhances the stability of the shared pinned layer of the bottom side by side sensors. The EPL does not have a back edge that is aligned with the back edges of the free layers of the sensors on both levels and the pinned layer of the sensor on the second level. In some embodiments, it may be advantageous to completely etch through the pinned layer of the bottom sensors, and that may be accomplished in a self-aligned process as the one described here by simply extending the etching time.

Portions of the capping layer 510, free layer 508, spacer layer 506, pinned layer 504, and seed layer 502 not covered by the resist 702 are then removed by an ion milling process to expose a portion of the spacer layer 402. In one embodiment, the ion milling process also removes a portion of the spacer layer 402, as shown in FIGS. 7A-7C. Since the spacer layer 402 is relatively thick, such as over 15 nm, stopping the ion milling process somewhere in the spacer layer 402 is easy to achieve. The layers 510, 508, 506, 504 and 502 have one end at the ABS, but the other end (the back edge) is at a location 704 that is also recessed from the ABS, but is closer to the ABS than the location 602. As a result of the removal process, the stripe heights of the free layer 508 and the pinned layer 504 of the top sensor 512 are defined, indicated as "D1." In one embodiment, the stripe height "D1" is about 30 nm. In one embodiment, a protective layer (not shown) may be deposited on the back edge of the sensor 512 to prevent corrosion during subsequent reactive ion etching (RIE) processes. The protective layer may be alumina or silicon nitride.

Next, a removal process is performed to remove portions of the spacer layer 402 and the lead layer 320 not covered by the resist 702 to expose a portion of the bias capping layer 326 at location A (FIG. 5), as shown in FIG. 8A. The removal process also removes portions of the spacer layer 402 and the insulative nonmagnetic material 330 not covered by the resist to expose a portion of the spacer layer 308 at location B (FIG. 5), as shown in FIG. 8B. If the spacer layer 402 is a material such as silicon dioxide, silicon nitride, or tantalum oxide that can be etched using a fluorine based RIE, this etch would also attack the insulative nonmagnetic material 330 beneath the spacer layer 402 at location B if the insulative nonmagnetic material 330 were made of similar materials. That is one reason that the insulative nonmagnetic material 330 includes aluminum oxide or a similar insulating material that is not etched in a fluorine RIE chemistry. The non-RIEable insulative nonmagnetic material 330 protects the spacer layer 308 at location B during the RIE step. At location C (FIG. 5), portions of the spacer layer 402 and lead layer 318 not covered by the resist 702 are removed to expose a portion of the capping layer 314. The removal process may be a RIE process if both the spacer layer 402 and the lead layer 318 are etchable in a fluorine based RIE, or a RIE process followed by ion milling if the lead layer 318 cannot be etched in the same chemistry as the spacer layer 402.

An ion milling step is then performed. At location A this mill will remove portions of the bias capping layer 326 and bias material 322 that are not covered by the resist 702 to expose a portion of the bias material 322, as shown in FIG. 9A. In one embodiment, the bias capping layer 326 is comprised of a material that is resistant to ion milling, thus, the bias material 322 is not affected by the ion milling process. In another embodiment, the portion of the bias material 322 not covered by the resist 702 is removed by the ion milling process. In that event, it is important that this removal not adversely affect the ability of the bias material 322 to stabilize the sensors 332, 334. Depending on how much of the insulative nonmagnetic material 330 remains after the RIE is completed (FIG. 8B), the ion milling process may also remove a portion of the spacer layer 308 that is not covered by the resist 702 to expose the pinned layer 306 at location B (FIG. 5), as shown in FIG. 9B. If too much of pinned layer 306 were to be ion milled, it could affect the shared pinned layer 306, therefore in one embodiment, the materials for insulative nonmagnetic material 330 are chosen so that milling of the pinned layer 306 in FIG. 9B does not occur or is minimal. Portions of the capping layer 314, the free layer 310 and the spacer layer 308 not covered by the resist 702 are also removed by the ion milling process to expose the a portion of the pinned layer 306 at location C (FIG. 5), as shown in FIG. 9C. The ion milling rate of the spacer layer 308 is much slower than the milling rates of the capping layer 314 and the free layer 310, so there is ample process latitude to remove the free layer 310, with no or minimal milling into the pinned layer 306. The ion milling process aligns the back edges of the free layers 310, 316 with the back edges of the pinned layer 504 and the free layer 508 of the top sensor 512, causing the stripe heights of the free layers 310, 316 and 508 and the pinned layer 504 to be substantially identical. The ion milling process should not remove any portion of the pinned layer 306. Thus, the pinned layer 306 is an EPL which has a greater stripe height than the free layers 310, 316, 508 and the pinned layer 504. In other words, the pinned layer of the bottom sensor(s) is an EPL and the free layers of the bottom sensor(s), the free layers of the top sensor(s), and the pinned layer(s) of the top sensor(s) all have the same stripe height. In other embodiments, the ion milling process also removes a portion of the pinned layer 306, so the stripe height of the pinned layer 306 is the same as the stripe height of the free layers 310, 316 and 508 and the pinned layer 504, and the pinned layer 306 is not an EPL.

Next, an insulating material 1002 is formed on the exposed bias material 322 at location A (FIG. 5), as shown in FIG. 10A. The insulating material 1002 is also formed on the exposed pinned layer 306 at location B (FIG. 5), as shown in FIG. 10B, and at location C (FIG. 5), as shown in FIG. 10C. The resist 702 is removed by a lift off process and a top surface 1004 may be planarized by a CMP process.

In summary, a method for forming a magnetic read head having sensors on multiple levels is disclosed. The method includes forming a sensor on a second level that is over a first level on which side by side sensors are disposed. A photolithograph process is performed to form a resist that is disposed on the sensor on the second level. Portions of the free layers of the top and bottom sensors and the pinned layer of the top sensor not covered by the resist are removed through multiple removal processes. As a result, the stripe heights of the layers are defined and are the same for these layers. The pinned layer of the bottom sensor is not affected by the multiple removal process and is an EPL.

While the foregoing is directed to embodiments of the present invention, other and further embodiments of the invention may be devised without departing from the basic scope thereof, and the scope thereof is determined by the claims that follow.

What is claimed is:

1. A magnetic read head for multiple input multiple output recording, comprising:
    side by side sensors disposed over a shield, wherein the side by side sensors includes:
        the shield;
        a first pinned layer disposed over a portion of the shield;
        a first spacer layer disposed over the first pinned layer;
        a first free layer disposed over a first portion of the first spacer layer;
        a second free layer disposed over a second portion of the first spacer layer; and
        an insulative nonmagnetic material disposed over a third portion of the first spacer layer;
    a second spacer layer disposed over the side by side sensors; and
    one or more second sensors disposed over the second spacer layer.

2. The magnetic read head of claim 1, wherein the second spacer layer comprises a material selected from the group consisting of silicon dioxide, silicon nitride and tantalum oxide.

3. The magnetic read head of claim 2, further comprising a first lead layer disposed over the first free layer and a second lead layer disposed over the second free layer.

4. The magnetic read head of claim 1, wherein the second spacer layer comprises a magnetic metal.

5. The magnetic read head of claim 1, wherein the one or more second sensors includes:
    a second pinned layer disposed over the spacer layer;
    a third spacer layer disposed over the second pinned layer; and
    a third free layer disposed over the third spacer layer.

6. The magnetic read head of claim 5, wherein the first pinned layer has a first stripe height, the first free layer has a second stripe height, the second free layer has a third stripe height, the third free layer has a fourth stripe height and the second pinned player has a fifth stripe height.

7. The magnetic read head of claim 6, wherein the second, third, fourth and fifth stripe heights are substantially the same, and the first stripe height is greater than the second, third, fourth and fifth stripe height.

\* \* \* \* \*